No. 808,799. PATENTED JAN. 2, 1906.
A. J. WOOLMAN.
FERTILIZER DISTRIBUTER.
APPLICATION FILED MAY 25, 1905.
2 SHEETS—SHEET 1.
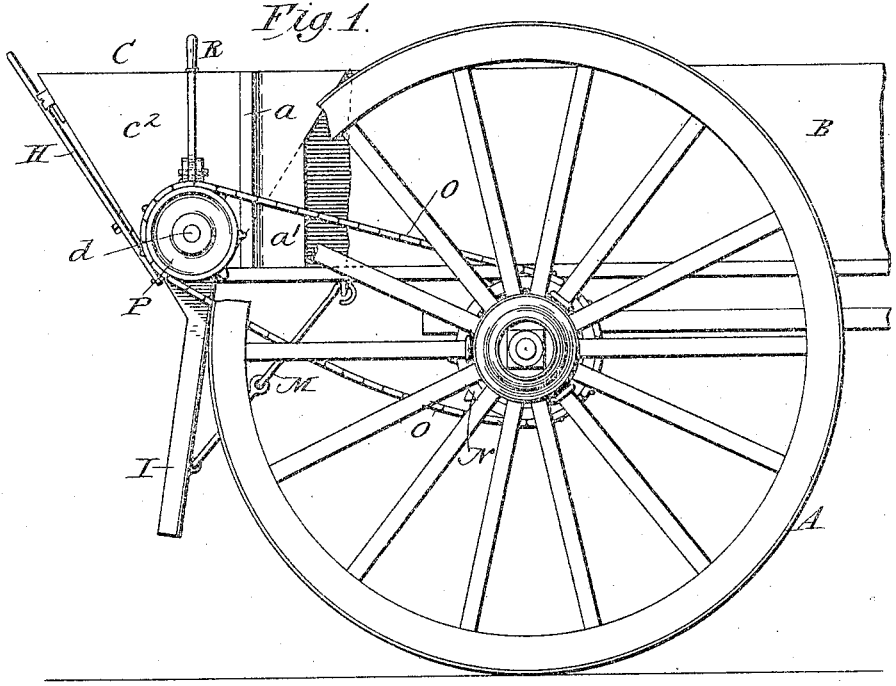
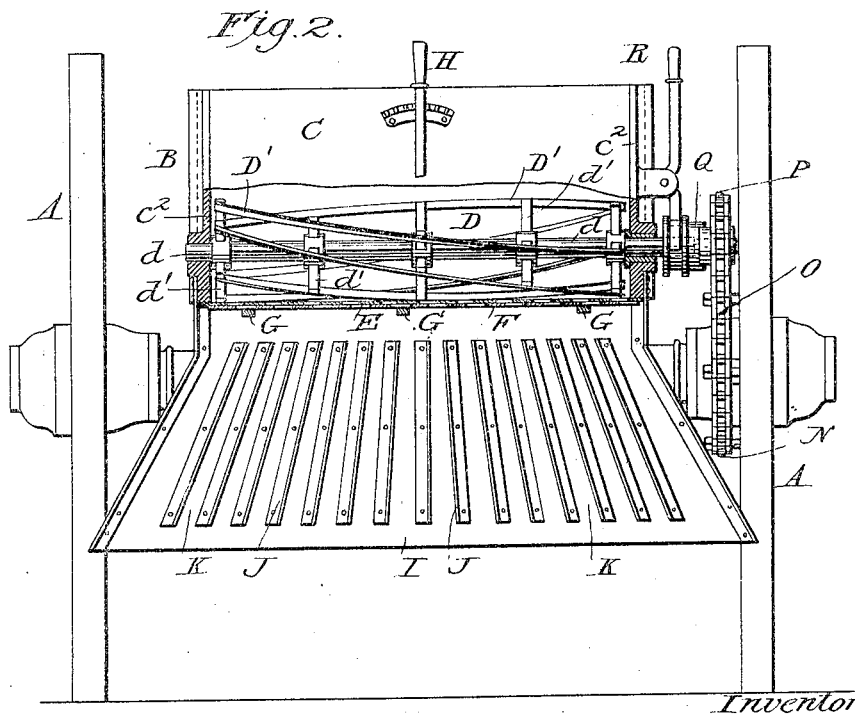
Witnesses:
Sidney P. Hollingsworth
K. H. Gary.
Inventor:
A. J. Woolman,
by his attorneys
Baldwin Wright.

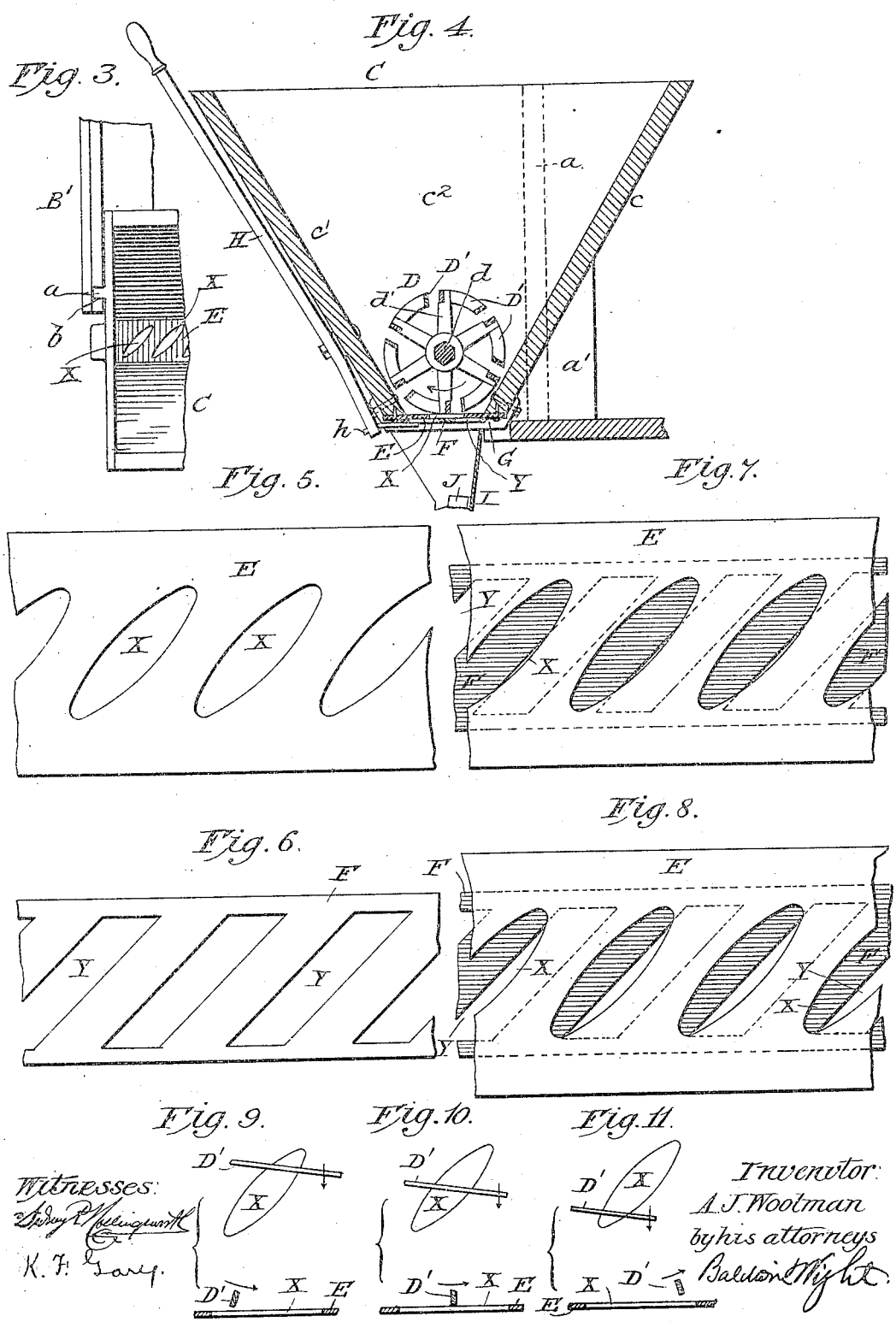

UNITED STATES PATENT OFFICE.

ALBERT J. WOOLMAN, OF URBANA, ILLINOIS.

FERTILIZER-DISTRIBUTER.

No. 808,799.          Specification of Letters Patent.          Patented Jan. 2, 1906.

Application filed May 25, 1905. Serial No. 262,214.

*To all whom it may concern:*

Be it known that I, ALBERT J. WOOLMAN, a citizen of the United States, residing at Urbana, in the county of Champaign and State of Illinois, have invented certain new and useful Improvements in Fertilizer-Distributers, of which the following is a specification.

The primary object of my invention is to provide simple and efficient means for distributing finely-divided fertilizing material, such as ground rock phosphate; but the machine which I have devised may also be employed for distributing other fertilizing material—such as lime, acid phosphate, potash salts, bone ashes, &c.—and it may also be employed for sowing corn, oats, and other grain.

In carrying out my invention I provide distributing mechanism which may be readily attached to or detached from an ordinary farm-wagon. A hopper is provided which when the end-gate of the wagon is removed may be easily attached to the wagon, and this hopper contains a rotary skeleton feed device or agitator comprising spiders radiated from a shaft and carrying diagonally-arranged blades which convey the material to the feed-openings in the bottom of the hopper, force it through them, and carry the lumps toward one end of the hopper, where they accumulate and from which they may be readily removed.

In the bottom of the hopper is arranged a plate which has a series of oval or elliptical openings, the major axes of which are arranged crosswise of and diagonally to the axis of the agitator, and the size of these openings may be varied by a sliding plate formed with correspondingly-arranged openings having preferably straight sides and ends. The plate is adjustable by means of a hand-lever, and the arrangement is such that the pulverized material is conveyed to and forced through the openings by the blades of the agitator, the material when finely ground and loose falling through the openings, but when damp or lumpy being forced against the edges of the opening, dragged along them, broken up or cut off, and caused to pass through the plates to a distributing-board having guide-ribs that convey the material in streams over the board to the bottom thereof, which is arranged relatively close to the ground, so that the material may be deposited before being blown about or scattered unduly by the wind.

The agitator-shaft is geared to one of the hind wheels of the wagon. Clutch mechanism is provided by means of which the agitator-shaft may be caused to rotate or remain at rest, and the sprocket-wheel on the hind wheel of the wagon is preferably made detachable therefrom.

In the accompanying drawings, Figure 1 shows a side elevation of the rear end of a wagon with my improvements applied, some of the parts being broken away in order to better illustrate other parts. Fig. 2 shows a rear elevation of a wagon with my improvements applied and with some of the parts broken away. Fig. 3 is a detail plan view illustrating particularly the manner in which the hopper is attached to the wagon. Fig. 4 shows a cross-section through my improved fertilizer-distributer, and this figure also illustrates how the hopper is attached to the wagon. Fig. 5 is a detail plan view of the stationary bottom plate of the hopper. Fig. 6 is a detail plan view of the adjustable plate for varying the size of the openings in the stationary plate. Fig. 7 is a detail plan view of both plates, showing how the size of the openings may be varied. Fig. 8 is a similar view with the sliding plate shifted to adjust the feed-openings. Figs. 9, 10, and 11 are diagrams illustrating the manner in which the material is delivered through the feed-openings.

As before stated, my improved fertilizer-distributer is intended to be attached to an ordinary farm-wagon. In the drawings, A indicates the rear wheels of such a wagon, and B the body thereof. Such wagons are usually provided with a tail-board which slides vertically in grooves $b$ at the rear ends of the sides B' of the wagon, as illustrated in Fig. 3. To attach my improved fertilizer-distributer, the tail-board is removed and the distributing mechanism is attached to the wagon in the manner illustrated. The hopper C is preferably of the form shown, being approximately V-shaped in cross-section. The front and rear sides $c$ $c'$ may be made of wood, while the ends $c^2$ are preferably made of metal. The ends may be formed with vertical ribs $a$, adapted to fit the grooves $b$, and preferably the end pieces are prolonged at $a'$ to form standards which rest on the bottom of the wagon-body and steady the connection between the hopper and the wagon. The agitator D is arranged in the lower portion of the hopper, and, as shown, it comprises a horizontal shaft $d$, from which radiate spider-arms $d'$, to which are attached diagonally-arranged blades D'. These blades all slant in the same direction and move in the direction indicated by the arrow in Fig. 4.

The fertilizing material which is carried to the field in the wagon is shoveled into the hopper, which is kept well filled, so that the pressure therein is approximately uniform. The material covers or surrounds the agitator and is carried in the direction indicated by the arrow in Fig. 4 toward the bottom of the hopper, from which it is delivered in the manner presently explained. The spiral arrangement of the blades tends to move the lumps frequently found in this kind of material toward one end of the hopper, and when the accumulation of lumps is unduly increased they may be readily removed from the hopper by the attendant. To the bottom of the hopper is secured a plate E, formed with a series of oval or elliptical openings X. These openings, it will be observed, have their major axes arranged crosswise relatively to the axis of the agitator and diagonally thereto. Below the plate E is another plate F, formed with diagonally-arranged openings Y. This plate is supported on cross-pieces G, bolted to the hopper and providing a guide in which the plate F may be moved in a direction parallel to the axis of the agitator-shaft to a limited extent by means of a hand-lever H, pivoted to the hopper and having a suitable connection at $h$ to the sliding plate. Below the hopper is arranged a distributing-board I, to the upper or outer face of which is attached a series of angle-irons J, between which are formed guides or chutes K, down which the material slides and from which it passes to the ground. By feeding the material in this way it is delivered to the ground evenly and has no chance to be unduly scattered by the wind. Preferably the feed-board is connected near its lower portion to the bottom of the wagon by links M, which are readily detachable from the wagon. The agitator-shaft may be connected to one of the hind wheels of the wagon by any suitable gearing. Preferably a sprocket-wheel N is detachably connected with one of the wheels, and this sprocket-wheel is geared to the agitator-shaft by means of a sprocket-chain O, which connects with a sprocket-wheel P on the agitator-shaft. This last-mentioned wheel is loose on the shaft, but may be connected therewith, so as to rotate it, by means of any suitable clutch mechanism Q, operated by a hand-lever R. When the distributing mechanism is attached to a wagon and the gearing is connected up in the manner before specified, the wagon may be driven to the field without rotating the agitator-shaft, the feed-openings in the plates E and F being at this time preferably completely closed. On arriving at the field the attendant may fill the hopper from the wagon. Then the clutch mechanism may be shifted to rotate the agitator-shaft, and the plate F may be adjusted to provide openings of the proper size to distribute the proper amount of material as the wagon progresses. From time to time the attendant may shovel fertilizing material into the hopper, so as to keep it well filled and maintain a substantially uniform pressure, as this will insure an even feed.

The particular shape and arrangement of the feed-openings and the construction of the agitator are important features of my invention. As I have already stated, the inclined or diagonally-arranged blades on the agitator tend to accumulate the lumps at one end of the hopper; but the diagonal blades also cause the pulverized material to be delivered to the feed-openings in an improved way. This will be made clear by inspecting Figs. 9, 10, and 11. It will be observed that the edges of the oval openings are diagonally arranged and the blades D' force the material against these diagonal edges and direct it along them, effecting a kind of shearing action which not only results in causing the finely-pulverized material to be delivered evenly and efficiently, but also effects the breaking up to a large extent of moist or lumpy material.

Figs. 7 and 8 illustrate the manner in which the feed-openings may be varied in size. When the plates are arranged in the manner illustrated in Fig. 8, the edges of the openings are such as to insure an efficient distribution and feed of material. One side of the elongated opening is straight, while the other side is curved. An acute angle is formed at each end of the opening. In adjusting the plate F the width of the opening is reduced more rapidly than the length thereof, so that as the agitator-blades sweep over the plates they have a relatively long space to traverse in forcing the pulverized material through the feed-openings; but the width of the openings is constricted, so that too much material need not be fed. If the width of the openings were increased or decreased proportionately with the length, the total area of the openings might be made too great and too much material might be fed; but where the length of the opening is maintained substantially uniform while the width thereof is varied a more efficient feed is obtained for the reason above specified—namely, the agitator-blades have a longer time to act while traversing the openings.

It will thus be seen that I have provided an efficient fertilizer-distributer in which the mechanism is very simple and may be easily applied to or detached from a farm-wagon of ordinary construction..

I claim as my invention—

1. A fertilizer-distributer comprising a hopper provided with distributing devices and formed with ribs $a$ adapted to fit the endgate groove in the wagon and having standards $a'$ adapted to rest on the bottom of the wagon and gearing for connecting distributing devices with a wheel of the wagon.

2. A fertilizer-distributer comprising a hopper having adjustable feed-openings at the bottom and a rotary agitator within the hopper comprising a skeleton frame and diagonally-arranged blades thereon for conveying the material to the feed-openings and for collecting the lumps of material at one end of the hopper.

3. A fertilizer-distributer comprising a hopper, a plate in the bottom thereof having oval or elliptical feed-openings the longer axes of which are arranged crosswise of and diagonally to the longer axis of the hopper and an agitator arranged above the plate and having blades which convey the material to the plate.

4. A fertilizer-distributer comprising a hopper, an agitator therein provided with diagonal blades, a plate in the bottom of the hopper having oval openings the longer axes of which are arranged crosswise of and diagonal to the axis of the agitator and an adjustable sliding plate having corresponding openings for varying the size of the feed-openings.

In testimony whereof I have hereunto subscribed my name.

ALBERT J. WOOLMAN.

Witnesses:
H. T. SCHUMACHER,
CHAS. M. GARDINER.